July 7, 1964 E. NABORNEY 3,140,202
DRY PULVERULENT BROWN SUGAR AND PROCESS FOR PRODUCING SAME
Filed Jan. 9, 1962
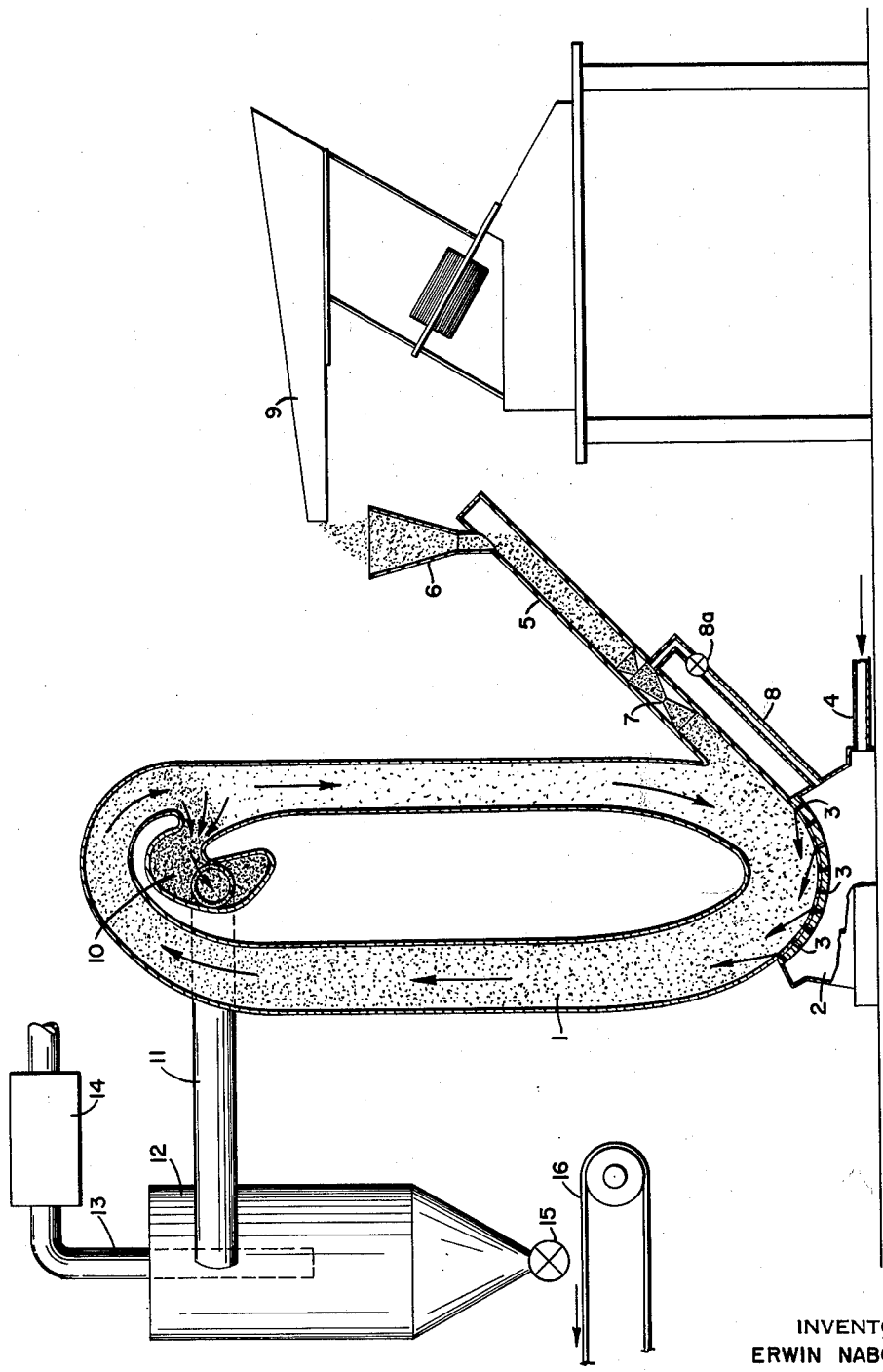
INVENTOR
ERWIN NABORNEY
BY
ATTORNEYS

United States Patent Office 3,140,202
Patented July 7, 1964

3,140,202
DRY PULVERULENT BROWN SUGAR AND PROCESS FOR PRODUCING SAME
Erwin Naborney, Fanwood, N.J., assignor to American Sugar Company, a corporation of New Jersey
Filed Jan. 9, 1962, Ser. No. 165,166
5 Claims. (Cl. 127—63)

This invention relates to an improved brown sugar product in powdered form and includes the new product and the method of producing it.

Commercial brown sugars are commonly marketed in a moist condition. The handling of such sugars presents a number of problems to the industrial user as well as to the domestic consumer. They are usually packaged in cartons or bags which are provided with moistureproof linings. So long as the bag or carton is closed, the brown sugar keeps its smooth texture. But when a carton of brown sugar is opened and exposed to the air at room temperature, the sugar has a tendency to lose some of its moisture under certain climatic conditions, and during this drying out period, the brown sugar tends to cake and harden. The hard lumps so formed are difficult to disintegrate and present a number of handling and mixing problems to the industrial or domestic user.

Brown sugar contains, in addition to pure sucrose as its principal constituent, a coating of molasses which imparts the distinctive flavor and color to this type of sugar. The molasses, which is composed of sucrose, invert sugar, ash, water and other crystallizable and non-crystallizable compounds, surrounds the sucrose crystals in the form of a thin, sticky film. As indicated above, when the brown sugar loses part of its moisture, by drying under certain atmospheric conditions, the thin film of molasses surrounding the sucrose crystals increases in stickiness and cements the adjacent crystals together, thus forming the hard lumps.

Due to its characteristic flavor, brown sugar is widely used in making fudges and other confectionery, frostings, icings, cake mixes, cookie mixes and other bakery goods and for other purposes where the flavor of brown sugar is desirable. For many of these and other purposes, it is highly desirable that the brown sugar be in dry, powdered form, having free-flowing characteristics, and that it retain such free-flowing characteristics without caking or becoming sticky, under fluctuating atmospheric conditions, over long periods of time.

The product of my present invention is composed entirely of brown sugar, no extraneous material being added. My present process is broadly distinguished from prior processes in that ordinary brown sugar, without addition of any other material, is reduced to a dry, free-flowing condition by a single process step, whereby the drying and grinding are simultaneously effected.

Because of the sticky, noncrystallizing constitutents of its molasses component and because the wet brown sugar contains both liquid invert and moisture, not only on the crystal surfaces but also encapsulated, it has not heretofore been considered possible to grind brown sugar to a dry pulverulent form without some type of preliminary drying. I have found, however, that in accordance with my present invention, simultaneous drying and pulverizing of wet brown sugar, as received from the centrifugal separator, may be economically and continuously effected in only a few seconds. By reason of a very brief heating time, the danger of decomposition, which might deleteriously affect taste or color, is minimized.

I have discovered, more particularly, that brown sugar products having the above-noted desirable characteristics can be readily, economically and continuously produced by subjecting ordinary commercial moist brown sugar to a simultaneous drying and grinding action of a fluid energy mill in which the particles of sugar, while suspended in heated air, or other inert dry gas, are subjected to attrition by violent impact between the solid particles. For this purpose, I have used most effectively a fluid energy mill of the type marketed by the Fluid Energy and Processing Equipment Company under their proprietary name, Jet-O-Mizer, and which is the subject of Patent No. 2,590,220.

While the effectiveness of my process is not dependent on an accurate understanding of the theory by which my remarkable results are accomplished, and I do not intend to be bound by such theory, it presently appears that the drying is greatly promoted by the simultaneous reduction in particle size through which the encapsulated moisture is constantly being exposed to the drying action of the warm, high velocity gas stream which, in turn, promotes further particle size reduction.

The process of my invention will be further described with reference to the accompanying drawing which represents, diagrammatically, a fluid energy mill of the above noted Jet-O-Mizer type especially adapted to the carrying out of the process. In the drawing the size of the particle is intended to be illustrative, rather than actual size.

This fluid energy mill consists essentially of a grinding chamber 1 in the form of an upright, elongated torus (doughnut shape), the cross-section of which is in the form of an inverted trapezoid, as more fully described in the above noted patent. An energizing gas chamber 2 is positioned beneath the lower end of the grinding chamber and is connected therewith through a plurality of fine orifices or nozzles indicated at 3. A gas under pressure, air, for instance, is supplied to chamber 2 through inlet 4 and is jetted at sonic or supersonic velocity into the lower portion of chamber 1 as a plurality of jet streams directed tangentially to the chamber wall, substantially as shown.

The wet brown sugar is fed to the grinding chamber through inlet conduit represented at 5 which enters the lower end of the chamber in a substantially tangential direction. At the outer end of the inlet conduit 5, there is provided a feed hopper represented at 6 from which the wet brown sugar flows by gravity into the inlet conduit 5.

Intermediate the ends of the inlet conduit 5, there is provided an injector represented at 7 to which gas under pressure is delivered from chamber 2 through the conduit 8, having valve 8a therein.

Suitable feeding means, for instance of vibratory feeder, indicated at 9, is provided for feeding the wet brown sugar at a predetermined, controlled rate into feed hopper 6.

In passing from the gas chamber 2 into the grinding chamber 1, the high pressure air is converted to tangentially directed sonic or supersonic gas streams causing suspension of the solid particles in the heated gases and violent impacts between the suspended particles, as previously described, and causing the suspension to circulate through the grinding chamber in a clockwise direction.

At the upper end of the grinding chamber, there is provided a classifying section, indicated at 10, from which the energizing gas is withdrawn through outlet conduit 11, carrying with it the pulverized, dry brown sugar particles in suspension. From conduit 11, the suspension is passed to a suitable separator, or separators, for instance a cyclone separator, as indicated at 12, whereby the solid particles are separated from the gases and are retained in the separator, the gases passing off through outlet 13 and dust collector 14 to the atmosphere. At the lower end of the separator, a valve, for instance a star valve, is indicated at 15 to permit withdrawal of the solid particles while inhibiting escape of the gases from the lower portion of the separator. The collected solids are withdrawn from the separator, as desired, onto a conveyor of any suitable type, indicated at 16.

By adjustment of the energizing gas thruput, relative to the dimensions of the apparatus, the velocity of the gases passing into the classifying section 10 is controlled so as to carry from the circulating, high-velocity gas stream only those solid particles which have been dried and reduced to a predetermined particle size. Such withdrawal of solid particles is, of course, opposed by centrifugal forces tending to throw the particles toward the outer wall of the mill, away from the entrance to the classifying section, so that the heavier, insufficiently dried and larger particles are recycled through the guiding chamber for further attrition and drying.

In carrying out the process of the present invention, the wet brown sugar, the temperature of which is relatively unimportant, is charged at a uniform and predetermined rate to the feed hopper 6 and passes by gravity therefrom into the inlet conduit 5 to the injector 7 by which it is injected into the grinding chamber 1 of the fluid energy mill. On entering chamber 1, it is quickly suspended in the high velocity, energizing gas streams and subjected to violent bombardment of particle against particle resulting in the simultaneous attrition and drying, as previously described. The lighter, dry and more finely-divided particles are withdrawn from the upper end of chamber 1 in a suspension of the effluent energizing gases, as just described, and are separated therefrom and collected by any suitable means while the heavier, incompletely dried, larger particles are recycled through the mill together with fresh feed.

It has previously been proposed to subject to treatment in a fluid energy mill certain types of solid materials where simple drying is required. But to my knowledge, it has not heretofore been known that wet brown sugar, or the like, containing materials difficult to dry, such as the molasses component, could be effectively dried and pulverized in a fluid energy mill.

By my process, localized overheating is avoided. Further, by my process, the customary loss of pulverized material through dusting or the caking of the material on the walls of the treating chamber is eliminated, and by reason thereof an extremely high product yield is obtained.

Also, in accordance with the present invention, I obtain an improved dry, pulverulent brown sugar product of uniform composition having good non-caking properties, its average particle size being about 5–8 microns and its maximum particle size being about 40 microns. The improved physical properties of my product, which are responsible for its improved quality, appear to be due to the simultaneously grinding and drying. The dried molasses component is more uniformly distributed through the powdered sucrose in some new and different physical association.

As the energizing gas, I prefer to use dry, heated air. However, other inert, dry, nontoxic gases may be used. The energizing gas, air for instance, is with advantage charged to the grinding nozzles 3 at a gauge pressure of about 75–100 pounds per square inch and preferably at a temperature of approximately 250° F. These temperatures and pressures do not appear to be especially critical, but are subject to some variation. For instance, air temperatures as high as 300° F. and as low as 75° F. have been satisfactorily used. It will be recognized, of course, that there will be a substantial temperature drop due to the Joule-Thompson effect at the discharge of the nozzles.

The invention will be illustrated by the following specific examples, but it will be understood that the invention is not restricted thereto.

*Example I*

No. 13 wet brown sugar, as received from the centrifugal, was charged to the fluid energy mill at a rate of 17.4 pounds per hour. Air was charged to the grinding nozzles at a pressure of 82–86 p.s.i.g. and at a temperature of 246° F. and air was charged to the feed injector at a temperature of 246° F. and a pressure of 50 p.s.i.g. The moisture content of the charge was 3.66% and its invert content was 5%, each by weight. The resultant product was found to be finely pulverized and appeared to be dry. By analysis, its moisture content was found to be 0.48%.

*Example II*

In a similar operation carried on in an apparatus, and under conditions, identical with those of Example I, except that the feed rate was increased to 60 pounds per hour, a dry, finely-pulverized product was obtained having a moisture content of 0.57%.

Similar satisfactory results were obtained in a series of runs in which the energizing air was charged to the jets at gauge pressures varying from 75 to 100 pounds per square inch and at temperatures varying from 75° F. to 300° F.

I claim:

1. A process of converting wet granular brown sugar to a dry, pulverulent, non-caking brown sugar of uniform composition which comprises introducing said wet granular brown sugar into a fluid energy mill supplied with a stream of dry gas at a temperature in the range 75–300° F. as the energizing fluid, subjecting said granular brown sugar to treatment within said mill to effect simultaneous drying and grinding by suspending said granular brown sugar in the stream of dry gas supplied to said fluid energy mill to subject said granular brown sugar to attrition by violent impact between the solid particles of said granular brown sugar and recovering as product from said mill the aforesaid dry, pulverulent, non-caking brown sugar.

2. The process of claim 1 in which the energizing fluid is air.

3. A process of converting wet granular brown sugar to a dry, pulverulent, non-caking brown sugar of uniform composition which comprises introducing said wet granular brown sugar into a fluid energy mill supplied with a stream of dry gas at a temperature in the range 75–300° F. as the energizing fluid, subjecting said granular brown sugar within said mill to treatment to effect simultaneous drying and grinding by suspending said granular brown sugar in the stream of dry gas supplied to said fluid energy mill to subject said granular brown sugar to attrition by violent impact between the solid particles of said granular brown sugar and recovering from said mill as product a dry, pulverulent, non-caking brown sugar of uniform composition having an average particle size in the range about 5–8 microns with a maximum particle size of about 40 microns.

4. The process of claim 1 in which the energizing fluid is air supplied to the fluid energy mill at a temperature of about 250° F. and at a pressure in the range 50–100 p.s.i.g.

5. A process in accordance with claim 3 wherein said dry gas is air supplied to said fluid energy mill as said energizing fluid at a pressure in the range 50–100 p.s.i.g.

References Cited in the file of this patent

UNITED STATES PATENTS

| | | |
|---|---|---|
| 2,590,220 | Stephanoff | Mar. 25, 1952 |
| 2,668,128 | Oxnard et al. | Feb. 2, 1954 |
| 2,910,386 | Lachmann | Oct. 27, 1959 |
| 2,910,387 | Lachmann | Oct. 27, 1959 |
| 2,910,389 | Lachmann | Oct. 27, 1959 |